US012134265B2

(12) United States Patent
Saiga et al.

(10) Patent No.: US 12,134,265 B2
(45) Date of Patent: Nov. 5, 2024

(54) IMAGE FORMING APPARATUS

(71) Applicants: Soichi Saiga, Tokyo (JP); Atsushi Yanaka, Saitama (JP); Kiyoshi Tsukamura, Kanagawa (JP)

(72) Inventors: Soichi Saiga, Tokyo (JP); Atsushi Yanaka, Saitama (JP); Kiyoshi Tsukamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 17/690,383

(22) Filed: Mar. 9, 2022

(65) Prior Publication Data

US 2022/0314663 A1 Oct. 6, 2022

(30) Foreign Application Priority Data

Mar. 30, 2021 (JP) ................................ 2021-058758
Feb. 4, 2022 (JP) ................................ 2022-016445

(51) Int. Cl.

*B65H 5/06* (2006.01)
*B41J 13/02* (2006.01)
*B41J 13/10* (2006.01)
*B41J 29/393* (2006.01)

(52) U.S. Cl.

CPC ........... *B41J 13/025* (2013.01); *B41J 13/103* (2013.01); *B41J 13/106* (2013.01); *B41J 29/393* (2013.01)

(58) Field of Classification Search

CPC ...... B41J 13/025; B41J 13/103; B41J 13/106; B65H 5/062; B65H 5/06; B65H 2404/1341; B65H 11/06; B65H 11/0035
See application file for complete search history.

(56) References Cited

U.S. PATENT DOCUMENTS 8,215,636 B2 * 7/2012 Youn ...................... B65H 5/062 271/274
2010/0231643 A1 9/2010 Saiga et al.
2010/0295897 A1 11/2010 Naruse et al.
2011/0134187 A1 6/2011 Naruse et al.
2011/0134190 A1 6/2011 Mase et al.
2011/0141192 A1 6/2011 Komuro et al.
2011/0199410 A1 8/2011 Mase et al.
2011/0205299 A1 8/2011 Naruse et al.
(Continued)

FOREIGN PATENT DOCUMENTS

JP 2010254448 A * 11/2010
JP 2011-083973 4/2011
(Continued)

*Primary Examiner* — Luis A Gonzalez
(74) *Attorney, Agent, or Firm* — Harness, Dickey & Pierce, P.L.C.

(57) ABSTRACT

An image forming apparatus includes a printing device, a nipping rotator, an upstream support stand, a plurality of rotators, a supporter, and an adjusting mechanism. The printing device prints an image on a plate-shaped printing medium. The nipping rotator conveys the plate-shaped printing medium. The upstream support stand supports the plate-shaped printing medium at a position upstream from the nipping rotator in a conveyance direction of the plate-shaped printing medium. The plurality of rotators are disposed side by side. The supporter supports the plurality of rotators. The adjusting mechanism adjusts relative positions of the plurality of rotators and the supporter.

10 Claims, 11 Drawing Sheets

(56) References Cited

U.S. PATENT DOCUMENTS

| | | | | |
|---|---|---|---|---|
| 2011/0216113 | A1 | 9/2011 | Yorimoto et al. | |
| 2011/0316924 | A1* | 12/2011 | Kobayashi | B41J 11/06<br>347/16 |
| 2012/0056936 | A1 | 3/2012 | Shimizu et al. | |
| 2012/0062649 | A1 | 3/2012 | Naruse et al. | |
| 2013/0034376 | A1 | 2/2013 | Saiga et al. | |
| 2014/0063123 | A1 | 3/2014 | Saiga et al. | |
| 2016/0121634 | A1 | 5/2016 | Saiga et al. | |
| 2016/0297212 | A1 | 10/2016 | Saiga et al. | |
| 2018/0311983 | A1 | 11/2018 | Saiga et al. | |
| 2021/0001651 | A1 | 1/2021 | Saiga et al. | |

FOREIGN PATENT DOCUMENTS

| | | |
|---|---|---|
| JP | 2014-176973 | 9/2014 |
| WO | WO2010/103664 A1 | 9/2010 |

* cited by examiner

IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2021-058758, filed on Mar. 30, 2021, and 2022-016445, filed on Feb. 4, 2022, in the Japan Patent Office, the entire disclosure of which is hereby incorporated by reference herein.

BACKGROUND

Technical Field

Embodiments of this disclosure relate to an image forming apparatus.

Related Art

Typical image forming apparatuses may include a detachable auxiliary conveyance member to convey a plate-shaped printing medium such as a building material or a plastic plate which is a recording medium other than a sheet-shaped recording medium.

SUMMARY

In an embodiment of the present disclosure, there is provided an image forming apparatus that includes a printing device, a nipping rotator, an upstream support stand, a plurality of rotators, a supporter, and an adjusting mechanism. The printing device prints an image on a plate-shaped printing medium. The nipping rotator conveys the plate-shaped printing medium. The upstream support stand supports the plate-shaped printing medium at a position upstream from the nipping rotator in a conveyance direction of the plate-shaped printing medium. The plurality of rotators are disposed side by side. The supporter supports the plurality of rotators. The adjusting mechanism adjusts relative positions of the plurality of rotators and the supporter.

In another embodiment of the present disclosure, there is provided an image forming apparatus that includes a printing device, a nipping rotator, an upstream support stand, a plurality of rotators, a supporter, and an adjusting mechanism. The printing device prints an image on a plate-shaped printing medium. The nipping rotator rotates while nipping the plate-shaped printing medium and conveys the plate-shaped printing medium. The upstream support stand supports the plate-shaped printing medium at a position upstream from the nipping rotator in a conveyance direction of the plate-shaped printing medium. The plurality of rotators are disposed side by side. The supporter supports the plurality of rotators. The adjusting mechanism adjusts relative positions of the plurality of rotators and the supporter.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
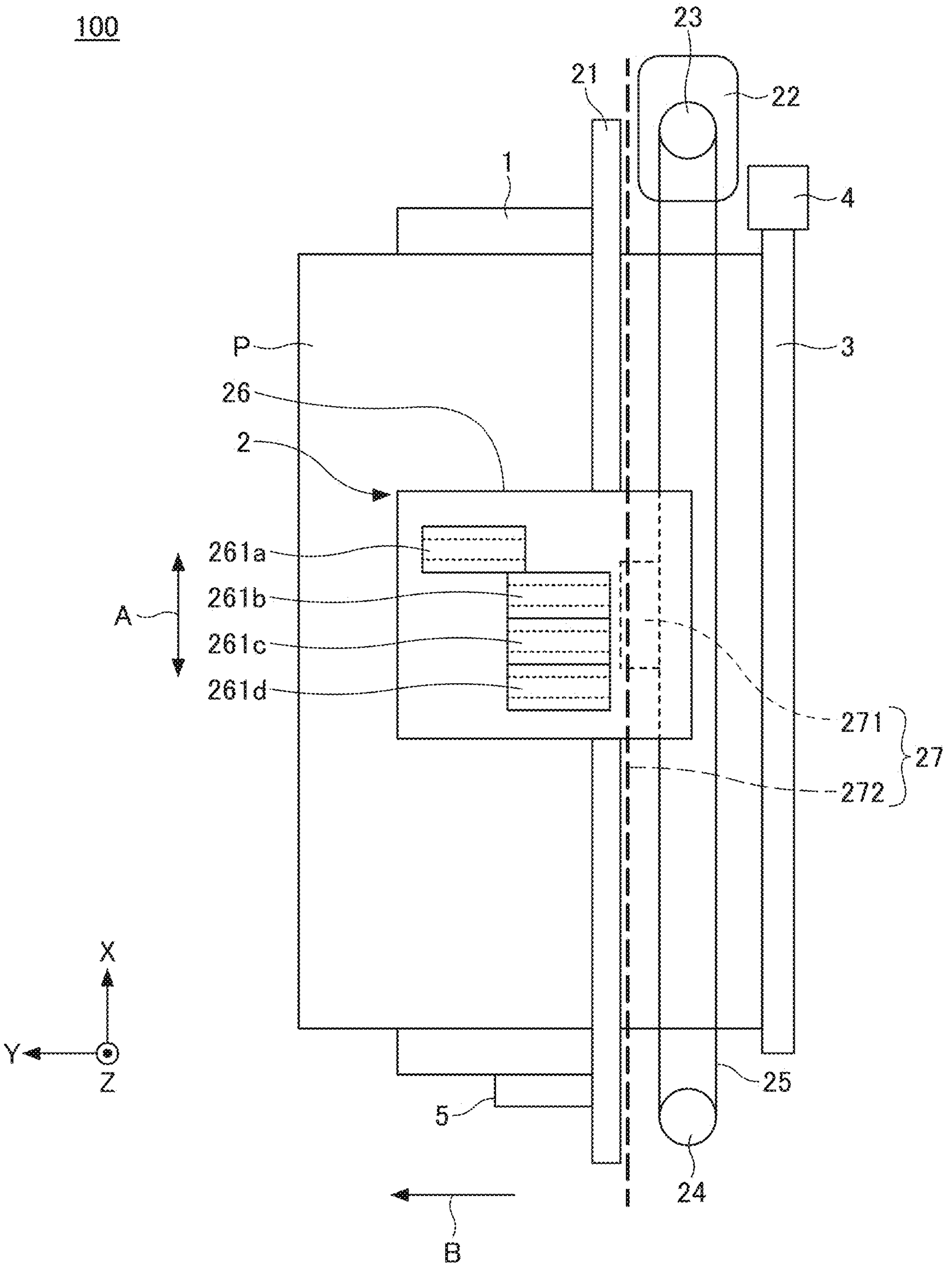
FIG. 1 is a diagram illustrating a vicinity of a printing unit of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to accompanying drawings. In the drawings, the same components are denoted by the same reference numerals, and redundant description is omitted as appropriate.

Further, the embodiments described below are some examples of an image forming apparatus for embodying the technical idea of the disclosure, and embodiments of the disclosure are not limited to the embodiments described below. For example, the dimension, material, and shape of components and the relative positions of the arranged components are given by way of example in the following description, and the scope of the present disclosure is not limited thereto unless particularly specified. The size, positional relation, and the like of components illustrated in the drawings may be exaggerated for clarity of description.

An image forming apparatus according to an embodiment includes a printing unit, a nipping rotator, and an upstream support stand. The printing unit prints an image on a plate-shaped printing medium. The nipping rotator conveys the plate-shaped printing medium to the printing unit. The upstream support stand supports the plate-shaped printing medium upstream from the nipping rotator in a conveyance direction.

The plate-shaped printing medium is a plate-shaped member such as a building material or a plastic plate and is a printing medium that is heavier than a sheet-shaped printing medium such as paper. The term "building material" refers to a material for construction. For example, the building material is a wooden plate-shaped member used for a wall or a ceiling of a building. Further, the plastic plate refers to a plate-shaped member including a plastic material. For example, the plastic plate is a plate-shaped member serving as a base material of a signboard.

In one or more embodiments, when such a plate-shaped printing medium is conveyed in the conveyance direction by a medium conveyance mechanism and is positioned on a medium supporter, the plate-shaped printing medium is supported by the upstream support stand so that a skew of the plate-shaped printing medium due to the influence of conveying resistance is restrained. The term "skew" refers to traveling obliquely. The term "obliquely" includes both a state where the plate-shaped printing medium is inclined in-plane and travels obliquely with respect to the conveyance direction and a state where the plate-shaped printing medium is inclined out-of-plane (in a flapping direction) and travels obliquely with respect to the conveyance direction.

In one or more embodiments, the image forming apparatus includes a plurality of rotators disposed side by side, a supporter that supports the plurality of rotators, and an adjustment mechanism that adjusts relative positions of the plurality of rotators and the supporter. In one or more embodiments, the adjustment mechanism adjusts the position of the rotator with respect to the support stand and increases an area of contact between the rotator and the plate-shaped printing medium so as to prevent deterioration of the performance of conveying the plate-shaped printing medium. For example, in an embodiment, a decrease in productivity of conveyance of the printing medium is prevented. Anisotropy of conveyance that causes a difference in conveyance performance depending on the conveyance direction is prevented. Regardless of the conveyance direction, the conveyance performance is uniformized.

Hereinafter, an embodiment is described as an example of a liquid-discharge-type image forming apparatus that forms an image by discharging liquid from a liquid discharge head onto a plate-shaped printing medium. Note that image formation, recording, and printing in the terms of the embodiments are synonymous.

The liquid is not limited to a particular liquid and may be any liquid having a viscosity or a surface tension to be discharged from a liquid discharge unit. However, preferably, the viscosity of the liquid is not greater than 30 mPa·s under ordinary temperature and ordinary pressure or by heating or cooling. Specific examples of the liquid include a solution, a suspension, or an emulsion containing, for example, a solvent such as water or an organic solvent, a colorant such as dye or pigment, a functional material such as a polymerizable compound, a resin, or a surfactant, a biocompatible material such as deoxyribonucleic acid (DNA), amino acid, protein, or calcium, and an edible material such as a natural colorant. The above-described examples may be used for inkjet inks, for example.

The liquid discharge head is a functional part that discharges and jets liquid from nozzles. Examples of an energy source for generating energy to discharge liquid include a piezoelectric actuator (a laminated piezoelectric element or a thin-film piezoelectric element), a thermal actuator that employs a thermoelectric conversion element such as a thermal resistor, and an electrostatic actuator including a diaphragm and opposed electrodes.

In the following description, directions may be indicated by an X axis, a Y axis, and a Z axis. An X direction along the X axis indicates a main scanning direction in which a carriage included in the image forming apparatus moves back and forth. A Y direction along the Y axis indicates a sub-scanning direction along the conveyance direction in which the plate-shaped printing medium is conveyed. A Z direction along the Z axis indicates a direction orthogonal to both the X axis and the Y axis.

A direction indicated by arrow along the X axis is referred to as a +X direction. A direction opposite the +X direction is referred to as a −X direction. A direction indicated by arrow along the Y axis is referred to as a +Y direction. A direction opposite the +Y direction is referred to as a −Y direction. A direction indicated by arrow along the Z axis is referred to as a +Z direction. A direction opposite the +Z direction is referred to as a −Z direction. The image forming apparatus conveys the plate-shaped medium in the +Y direction. However, the above-described directions do not limit the orientation of the image forming apparatus. The image forming apparatus may be disposed in any orientation.

First Embodiment

FIG. 1 is a diagram illustrating a configuration around a printing unit 2 in an image forming apparatus 100 according to an embodiment. As illustrated in FIG. 1, the image forming apparatus 100 includes a platen 1, a printing unit 2, a registration roller pair 3, a sub-scanning motor 4, and a maintenance-and-recovery mechanism 5.

The platen 1 is a medium supporter that supports a plate-shaped printing medium P. The platen 1 has a supporting face formed with high flatness and supports the plate-shaped printing medium P with the supporting surface. Thus, the platen 1 accurately maintains the positional relationship between the plate-shaped printing medium P and a carriage 26 disposed in the printing unit 2.

The printing unit 2 includes a guide rod 21, a main scanning motor 22, a drive pulley 23, a driven pulley 24, a timing belt 25, the carriage 26, and a linear encoder 27.

The printing unit 2 serving as a printing device prints an image above the platen 1 while the guide rod 21, the main scanning motor 22, the drive pulley 23, the driven pulley 24, and the timing belt 25 reciprocally move the carriage 26 along main scanning directions A.

The guide rod 21 is a guide hung between both side plates of the image forming apparatus 100 along the X axis together with a guide stay. The guide rod 21 supports the carriage 26 such that the carriage 26 moves in the main scanning directions A.

The main scanning motor 22 is a driving source for moving reciprocally the carriage 26 disposed proximate to the drive pulley 23. A timing belt 25 is wound around the drive pulley 23 that is rotated by the main scanning motor 22 and the driven pulley 24 that is disposed opposite the drive pulley 23 in the main scanning direction A. A belt holding portion of the carriage 26 is fixed to the timing belt 25. The main scanning motor 22 drives and reciprocally moves the carriage 26 along the main scanning directions A.

The carriage 26 includes four recording heads 261*a*, 261*b*, 261*c*, and 261*d* in which the liquid discharge head and a head tank for supplying liquid to the head are integrated. The number of recording heads is not limited to four and may be selected as appropriate for the use of the image forming apparatus 100.

Each of the four recording heads 261*a*, 261*b*, 261*c*, and 261*d* has a nozzle array in which a plurality of nozzles are arranged along a conveyance direction B. Each nozzle in the nozzle array discharges liquid in the −Z direction. The recording head 261*a* is shifted from the recording heads 261*b*, 261*c*, and 261*d* by one nozzle array along the conveyance direction B.

Each of the recording heads 261*a*, 261*b*, 261*c*, and 261*d* has two nozzle arrays. Each of the recording heads 261*a* and 261*b* discharges liquid droplets of black from the two nozzle arrays. The recording head 261*c* discharges liquid droplets of cyan from one of the two nozzle arrays and does not use the other one of the two nozzle arrays. The recording head 261*d* discharges liquid droplets of yellow from one of the two nozzle arrays and discharges liquid droplets of magenta from the other one of the two nozzle arrays.

Accordingly, the image forming apparatus 100 prints a monochrome image having a width corresponding to a width of two recording heads by one movement in the main scanning direction A using the recording heads 261*a* and 261*b*. The image forming apparatus 100 prints a color image using, for example, the recording heads 261*b*, 261*c*, and 261*d*. The configuration of the recording head is not limited to the above-described configuration and may be selected as appropriate for the use of the image forming apparatus 100.

The linear encoder 27 includes an encoder sheet 271 and an encoder sensor 272. The encoder sheet 271 is disposed along the main scanning directions A. The encoder sensor 272 is disposed on the carriage 26 and reads the encoder sheet 271 while moving with the movement of the carriage 26. The image forming apparatus 100 detects the position and speed of the carriage 26 from an output of the linear encoder 27.

The registration roller pair 3 serves as a pair of nipping rotators that nips the plate-shaped printing medium P, according to the present embodiment. The sub-scanning motor 4 is a medium conveying mechanism that drives and rotates the registration roller pair 3 to feed the plate-shaped printing medium P in the conveyance direction B and position the printing medium P on the platen 1.

The registration roller pair 3 feeds the plate-shaped printing medium P along the conveyance direction B by nipping the plate-shaped printing medium P between a pair of rollers and being rotated by the sub-scanning motor 4. The medium conveying mechanism may include a mechanism such as a gear, a belt, or a pulley in addition to the sub-scanning motor 4. At least one of the pair of two rollers included in the registration roller pair 3 is a drive roller. The roller other than the drive roller of the two rollers is a driven roller.

The maintenance-and-recovery mechanism 5 is proximate to a side of the platen 1 in the −X direction in the image forming apparatus 100. The maintenance-and-recovery mechanism 5 maintains and recovers the recording heads 261*a*, 261*b*, 261*c*, and 261*d*.

The plate-shaped printing medium P is fed by the registration roller pair 3 to a printing area in which printing on the plate-shaped printing medium P is performed in a main scanning movement area in which the carriage 26 is moved along the main scanning directions A. Thereafter, the plate-shaped printing medium P is intermittently fed in the conveyance direction B by the registration roller pair 3.

Ink cartridges that function as main tanks replaceably attached to the image forming apparatus 100 supply respective color inks to the respective head tanks of the recording heads 261*a*, 261*b*, 261*c*, and 261*d* via respective supply tubes.

Figure 2A:
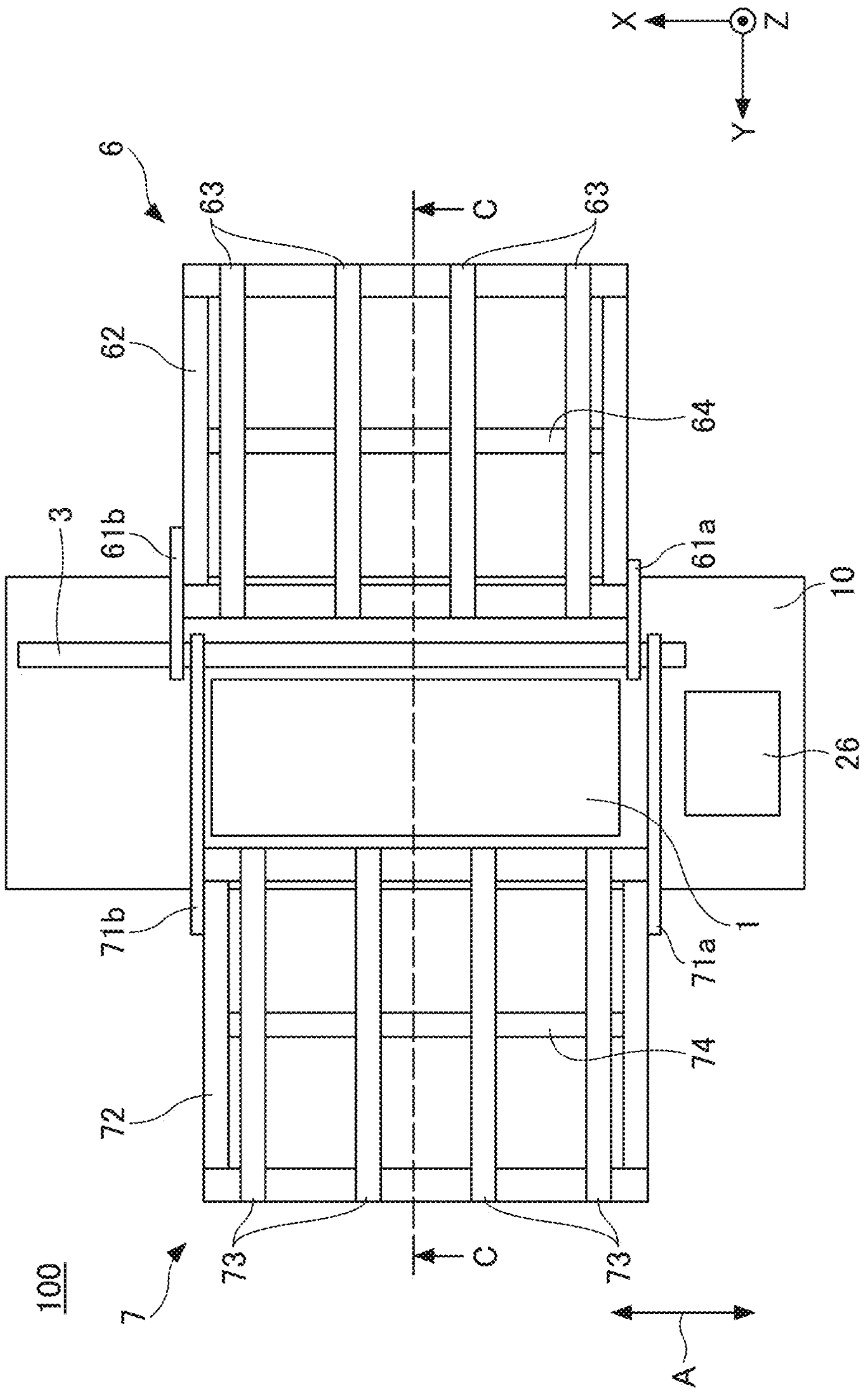
FIG. 2A is a top view of an upstream support stand and a downstream support stand according to an embodiment of the present disclosure.
Figure 2B:
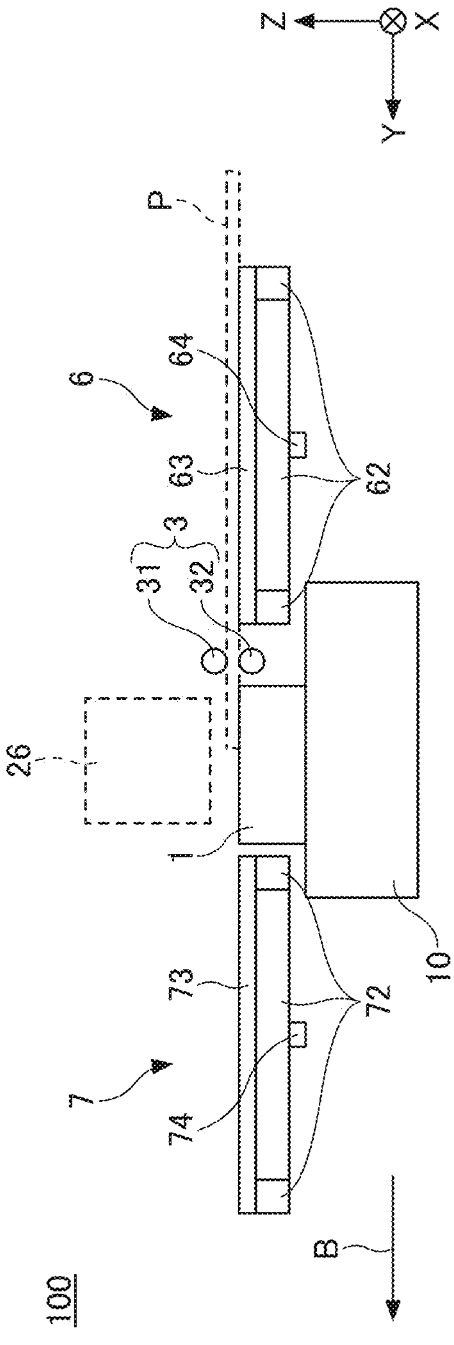
FIG. 2B is a cross-sectional view of the upstream support stand and the downstream support stand along a line C-C of FIG. 2A.

FIG. 2A is a top view of an upstream support stand 6 and a downstream support stand 7 in the image forming apparatus 100. FIG. 2B is a cross-sectional view of the upstream support stand 6 and the downstream support stand 7 along a line C-C of FIG. 2A. As illustrated in FIGS. 2A and 2B, the image forming apparatus 100 includes the upstream support stand 6, the downstream support stand 7, and a base portion 10. The base portion 10 is a component on which the platen 1 is placed.

As illustrated in FIG. 2B, the registration roller pair 3 includes an upper roller 31 and a lower roller 32 as a pair of rollers. The registration roller pair 3 conveys the plate-shaped printing medium P along the conveyance direction B while nipping the plate-shaped printing medium P between the upper roller 31 and the lower roller 32.

The upstream support stand 6 supports an upstream side of the plate-shaped printing medium P in the conveyance direction when the plate-shaped printing medium P is fed by the registration roller pair 3. The upstream support stand 6 is disposed upstream from the platen 1 along the conveyance direction B and supports the plate-shaped printing medium P from below in the vertical direction (+Z direction).

As illustrated in FIG. 2A, the upstream support stand 6 includes upstream mounts 61*a* and 61*b*, an upstream outer frame 62, upstream supporters 63, and an upstream reinforcing member 64. Materials of the above-described components are not particularly limited. The components may include a material such as metal or resin, for example.

Each of the upstream mounts 61*a* and 61*b* is a mount of the upstream support stand 6. The upstream mounts 61*a* and 61*b* are detachably attached to the registration roller pair 3. As the upstream mounts 61*a* and 61*b* abut against the registration roller pair 3, the upstream support stand 6 is positioned with respect to the registration roller pair 3.

Each of the upstream mounts 61*a* and 61*b* is a columnar member. The upstream mounts 61*a* and 61*b* are disposed on both sides of the platen 1 along the main scanning directions A. Each of the upstream mounts 61*a* and 61*b* abuts against the registration roller pair 3.

As the upstream mounts 61*a* and 61*b* abut against the registration roller pair 3, the upstream support stand 6 is attached to the registration roller pair 3 while being positioned with respect to the registration roller pair 3. By contrast, as the upstream mounts 61*a* and 61*b* are detached from the registration roller pair 3, the upstream support stand 6 is detached from the registration roller pair 3.

Note that, since the upstream mounts 61*a* and 61*b* have substantially the same configuration except for the positions where the upstream mounts 61*a* and 61*b* are disposed, the upstream mounts 61*a* and 61*b* may be collectively referred to as the upstream mount 61 or upstream mounts 61 below unless particularly distinguished.

The upstream outer frame 62 is a rectangular frame-shaped member in which four columnar members serving as respective edges of a rectangle are coupled by screws.

The upstream supporter 63 is a beam that is suspended between the columnar members of the upstream outer frame 62 and extends along the conveyance direction B. Specifically, the upstream supporters 63 include four beams, which are suspended between the two columnar members extending along the main scanning directions A of the upstream outer frame 62.

Each of the four upstream supporters 63 contacts the plate-shaped printing medium P with a side surface in the +Z direction and supports the plate-shaped printing medium P from below in the +Z direction. The upstream supporter 63 also has a function of reinforcing the mechanical strength of the upstream support stand 6 by being suspended between the columnar members of the upstream outer frame 62.

The upstream reinforcing member 64 is a beam that is suspended between the columnar members of the upstream outer frame 62 and extends along the main scanning directions A. The upstream reinforcing member 64 includes one beam, which is suspended between the two columnar members extending along the conveyance direction B of the upstream outer frame 62.

The weight of the upstream support stand 6 is reduced as the upstream support stand 6 includes the upstream outer frame 62, which is a frame-shaped member. The upstream supporter 63 and the upstream reinforcing member 64 of the upstream support stand 6 reinforces the mechanical strength of the upstream outer frame 62 and prevents bending of the upstream support stand 6.

The downstream support stand 7 supports a downstream side of the plate-shaped printing medium P in the conveyance direction when the plate-shaped printing medium P is fed by the registration roller pair 3. The downstream support stand 7 is disposed downstream from the platen 1 along the conveyance direction B and supports the plate-shaped printing medium P from below in the +Z direction.

As illustrated in FIG. 2A, the downstream support stand 7 includes downstream mounts 71*a* and 71*b*, a downstream outer frame 72, downstream supporters 73, and a downstream reinforcing member 74. Materials of the above-described components are not particularly limited. The components may include a material such as metal or resin, for example.

Each of the downstream mounts 71*a* and 71*b* is a mount of the downstream support stand 7. The downstream mounts 71*a* and 71*b* are detachably attached to the registration roller pair 3. As the downstream mounts 71*a* and 71*b* abut against the registration roller pair 3, the downstream support stand 7 is positioned with respect to the registration roller pair 3.

As the downstream mounts 71*a* and 71*b* abut against the registration roller pair 3, the downstream support stand 7 is attached to the registration roller pair 3 while being positioned with respect to the registration roller pair 3. By contrast, as the downstream mounts 71*a* and 71*b* are detached from the registration roller pair 3, the downstream support stand 7 is detached from the registration roller pair 3.

Each of the downstream mounts 71*a* and 71*b* is a columnar member. The downstream mounts 71*a* and 71*b* are disposed on both sides of the platen 1 along the main scanning directions A. Each of the downstream mounts 71*a* and 71*b* abuts against the registration roller pair 3.

The downstream mounts 71*a* and 71*b* are not necessarily limited to those attached to the registration roller pair 3. For example, separately from the registration roller pair 3 as a first roller, another roller as a second roller may be disposed downstream from the platen 1, and the downstream mounts 71*a* and 71*b* may be attached to the second roller. In this case, the downstream support stand 7 is positioned with respect to the second roller.

Note that, since the downstream mounts 71*a* and 71*b* have substantially the same configuration except for the positions where the downstream mounts 71*a* and 71*b* are disposed, the downstream mounts 71*a* and 71*b* may be collectively referred to as the downstream mount 71 or downstream mounts 71 below unless particularly distinguished.

The downstream outer frame 72 is a rectangular frame-shaped member in which four columnar members serving as respective edges of a rectangle are coupled by screws.

Each of the downstream supporter 73 is a beam that is suspended between the columnar members of the downstream outer frame 72 and extends along the conveyance direction B. Specifically, the downstream supporters 73 include four beams, which are suspended between the two columnar members extending along the main scanning directions A of the downstream outer frame 72.

Each of the four downstream supporter 73 contacts the plate-shaped printing medium P with a side surface in the +Z direction and supports the plate-shaped printing medium P from below in the +Z direction. The downstream supporter 73 also has a function of reinforcing a mechanical strength of the downstream support stand 7 by being suspended between the columnar members of the downstream outer frame 72.

The downstream reinforcing member 74 is a beam that is suspended between the columnar members of the downstream outer frame 72 and extends along the main scanning directions A. The downstream reinforcing member 74 includes one beam, which is suspended between the two columnar members extending along the conveyance direction B of the downstream outer frame 72.

The weight of the downstream support stand 7 is reduced as the downstream support stand 7 includes the downstream outer frame 72, which is a frame-shaped member. The downstream supporter 73 and the downstream reinforcing member 74 of the downstream support stand 7 reinforces the mechanical strength of the downstream outer frame 72 and prevents bending of the downstream support stand 7.

The configurations of the upstream support stand 6 and the downstream support stand 7 are not limited to the configurations illustrated in FIGS. 2A and 2B, and may be changed as appropriate for the size and weight of the plate-shaped printing medium P.

Figure 3:
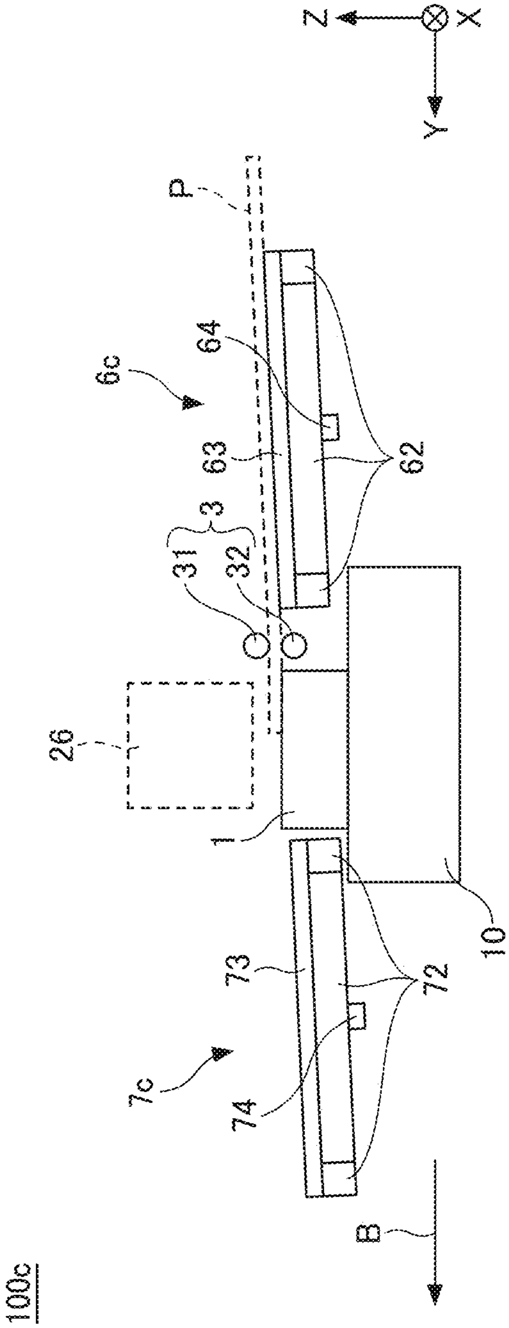
FIG. 3 is a diagram illustrating a configuration of an upstream support stand and a downstream support stand according to a first modification.

For example, inclining the upstream support stand 6 and the downstream support stand 7 prevents rattling during conveyance of the plate-shaped printing medium P. FIG. 3 is a cross-sectional view of an upstream support stand 6*c* and a downstream support stand 7*c* according to a first modification.

As illustrated in FIG. 3, in the vertical direction of an image forming apparatus 100*c*, an upstream side of the upstream support stand 6*c* in the conveyance direction is higher than a downstream side of the upstream support stand 6*c* in the conveyance direction. Further, in the vertical direction, a downstream side of the downstream support stand 7*c* in the conveyance direction is lower than an upstream side of the downstream support stand 7*c* in the conveyance direction. As described above, the upstream support stand 6 and the downstream support stand 7 may be inclined. However, only one of the upstream support stand 6*c* and the downstream support stand 7*c* may be inclined.

Figure 4A:
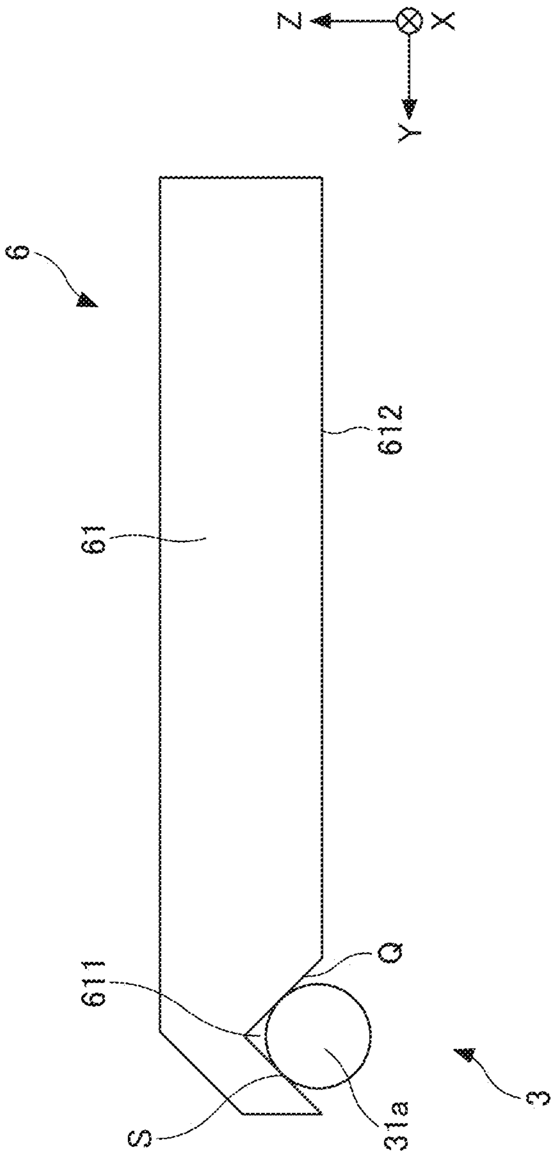
FIG. 4A is a view of an upstream mount attached to an upper roller.
Figure 4B:
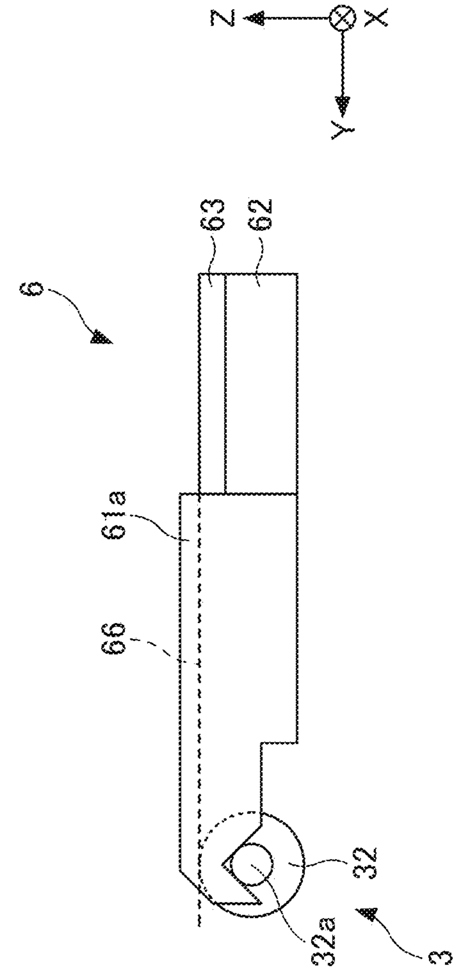
FIG. 4B is a view of the upstream mount attached to a lower roller.

FIG. 4A is a diagram illustrating a case where the upstream mount 61 is attached to the upper roller 31. FIG. 4B is a diagram illustrating a case where the upstream mount 61 is attached to the lower roller 32.

As illustrated in FIG. 4A, the upstream mount 61 has a recess 611 at one end thereof. The recess 611 is a recess having a substantially V-shaped cross section substantially orthogonal to an axial direction of the registration roller pair 3. Further, the recess 611 as a substantially V-shaped recess penetrates the upstream mount 61 along the axial direction of the registration roller pair 3.

Two surfaces S and Q included in the recess 611 contact a circumferential surface of a shaft center 31*a* included in the upper roller 31 of the registration roller pair 3. Thus, the upstream support stand 6 is positioned with respect to the registration roller pair 3. That is, the registration roller pair 3 is paired, and the upstream mount 61 of the upstream support stand 6 is attached to the upper roller 31, which is disposed above the lower roller 32 in the vertical direction.

The shape of the recess 611 is not necessarily a substantially V-shaped cross-sectional shape, and may be, for example, a rectangular cross-sectional shape. From a viewpoint of positioning stability, the recess 611 preferably has a substantially V-shaped cross-sectional shape to stably abut against the circumferential surface of the shaft center 31*a*.

A conveyance surface 66 illustrated in FIG. 4B indicates a surface on which the upstream mount 61 contacts the plate-shaped printing medium P when the plate-shaped printing medium P is conveyed. In the present embodiment, the conveyance surface 66 corresponds to a surface in the +Z direction of the upstream supporter 63.

The upstream support stand 6 is attached to the lower roller 32 via the upstream mount 61 so that the height along the Z direction of the conveyance surface 66 easily matches the height along the Z direction of the circumferential surface of the lower roller 32 which the plate-shaped printing medium P contacts when the plate-shaped printing medium P is conveyed. That is, the registration roller pair 3 is paired, and the upstream mount 61 of the upstream support stand 6 is attached to the lower roller 32, which is disposed below the upper roller 31 in the vertical direction. As a result, the skew of the plate-shaped printing medium P is more suitably restrained when the plate-shaped printing medium P is conveyed.

Although the upstream support stand 6 is illustrated in FIG. 4B, the downstream support stand 7 is also attachable to the lower roller 32. Substantially the same effects as described above are obtained. That is, the downstream mount 71 of the downstream support stand 7 may be attached to the upper roller 31, which is disposed above the lower roller 32 in the vertical direction, or may be attached to the lower roller 32, which is disposed below the upper roller 31 in the vertical direction. In one embodiment, the upstream support stand 6 may be attached to the upper roller 31; whereas the downstream support stand 7 may be attached to the lower roller 32. Thus, the upstream support stand 6 and the downstream support stand 7 may be attached to different rollers.

Figure 5A:
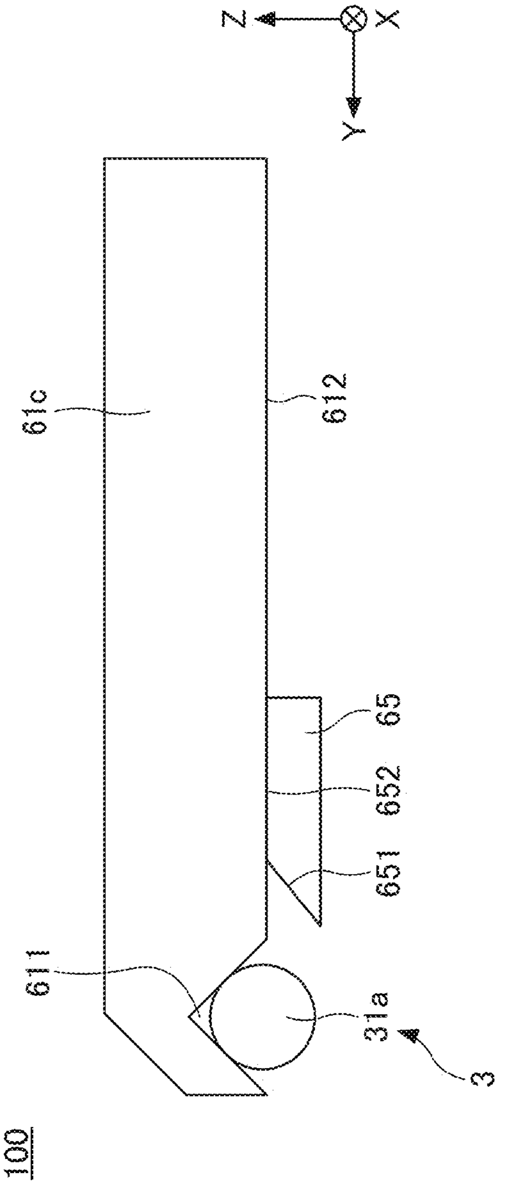
FIG. 5A is a view of an upstream mount before being locked according to a modification.
Figure 5B:
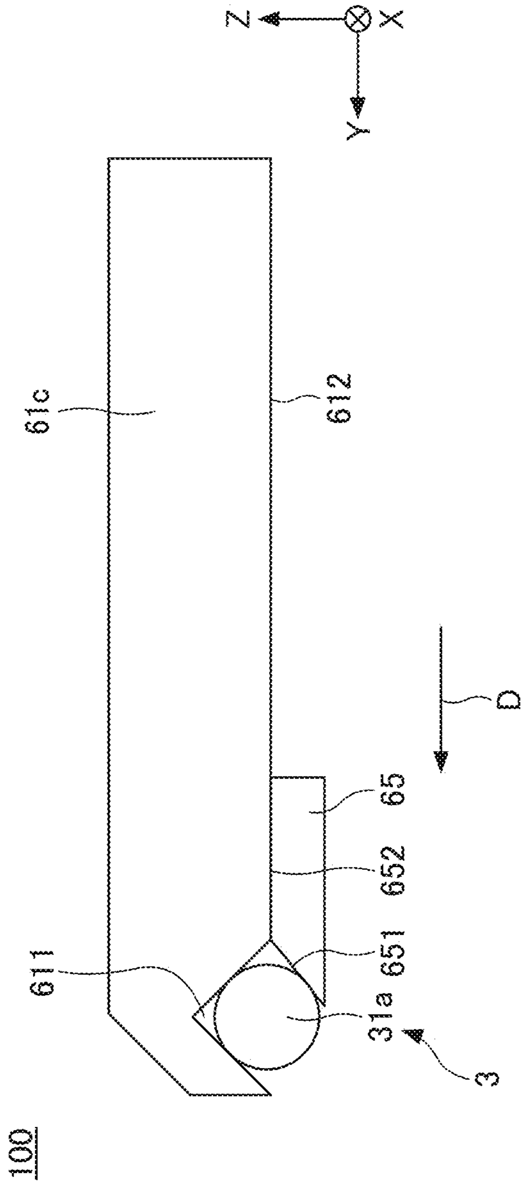
FIG. 5B is a view of the upstream mount locked according to the modification.

FIG. 5A is a diagram illustrating a configuration of an upstream mount 61*c* before being locked by an auxiliary member according to a modification. FIG. 5B is a diagram illustrating a configuration of the upstream mount 61*c* locked by the auxiliary member.

As illustrated in FIGS. 5A and 5B, the image forming apparatus 100 includes an auxiliary member 65. The auxiliary member 65 is disposed on a lower surface of the upstream mount 61*c* and is movable in the conveyance direction B. The auxiliary member 65 assists detachment of the upstream mount 61*c* from the shaft center 31*a*.

The auxiliary member 65 includes a slope 651 and is disposed to be movable along a moving direction D. As illustrated in FIG. 5A, the auxiliary member 65 does not contact the shaft center 31*a* before locking the upstream mount 61*c*. At the time of locking the upstream mount 61*c*, the auxiliary member 65 moves along the moving direction D until the slope 651 contacts the circumferential surface of the shaft center 31*a*.

The recess 611 simply abutting against the shaft center 31*a* may cause the shaft center 31*a* and the upstream mount 61*c* to be detached from each other through an open side of the recess 611. Since the slope 651 of the auxiliary member 65 contacts the circumferential surface of the shaft center 31*a*, detachment of the upstream mount 61*c* abutting against the shaft center 31*a* from the shaft center 31*a* is prevented.

When the upstream mount 61*c* is detached from the shaft center 31*a*, the auxiliary member 65 is moved in a direction opposite the moving direction D. As a result, one side of the recess 611 is opened, and thus the upstream mount 61*c* is detached such that the shaft center 31*a* passes through the open side of the recess 611.

In FIGS. 5A and 5B, the positioning of the upstream support stand 6 by the upstream mount 61*c* has been described. The downstream support stand 7 may be positioned in substantially the same manner, and therefore redundant description is omitted here.

Figure 6:
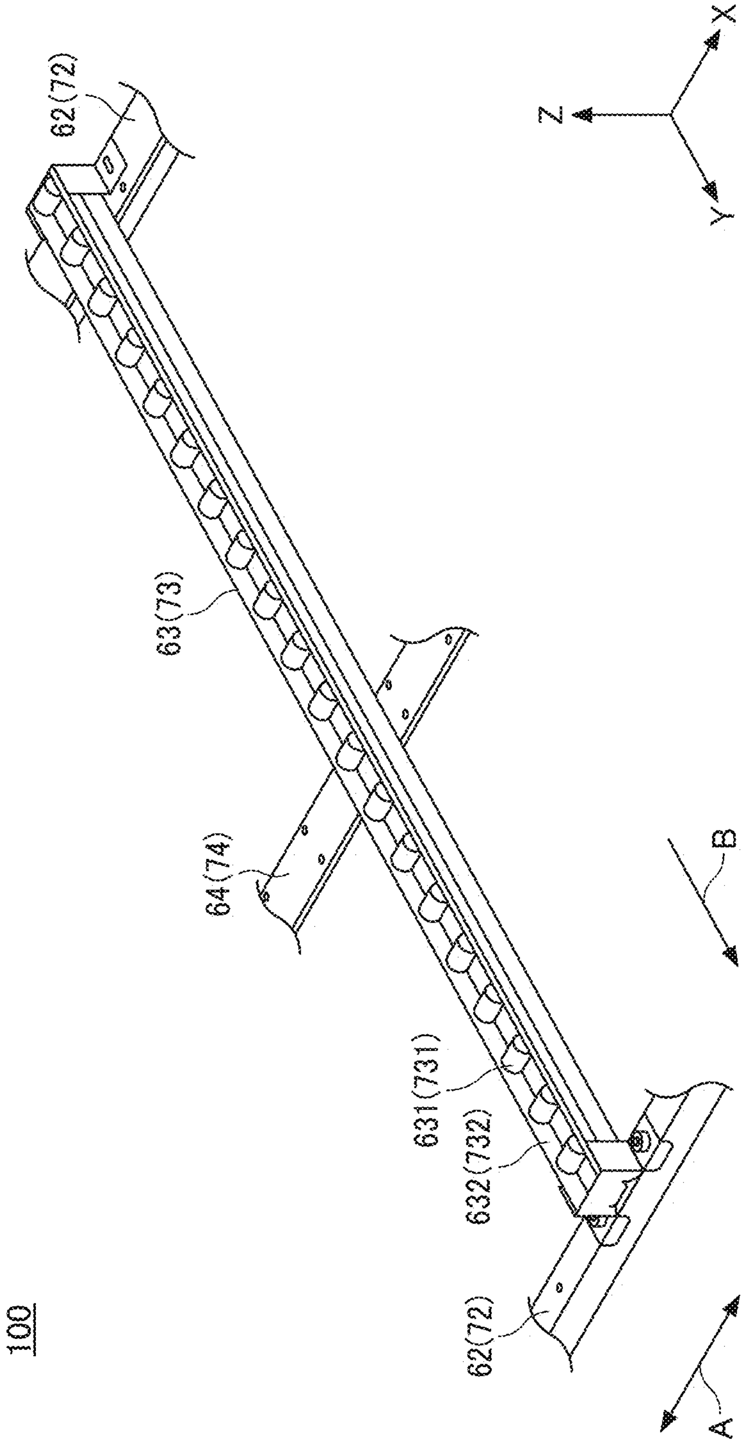
FIG. 6 is a diagram illustrating a configuration of an upstream supporter according to a first embodiment.

FIG. 6 is a diagram illustrating a configuration of the upstream supporter 63. As illustrated in FIG. 6, the upstream supporter 63 includes upstream rollers 631 and an upstream roller supporter 632.

The upstream rollers 631 serve as a plurality of rotators that contacts the plate-shaped printing medium P and are disposed side by side in the conveyance direction B, according to the present embodiment. The plurality of upstream rollers 631 has substantially the same configuration and may be collectively referred to as the upstream roller 631.

The upstream roller 631 is a cylindrical member rotatable around an axis along the main scanning directions A. A cylindrical axis and a rotation axis of the upstream roller 631 substantially coincide with each other. The upstream roller 631 contacts the surface of the plate-shaped printing medium P when the plate-shaped printing medium P is conveyed. The upstream roller 631 is rotated by the plate-shaped printing medium P conveyed to lower a conveying resistance of the plate-shaped printing medium P.

Materials of the upstream roller 631 are not particularly limited. Using plastic materials is preferable from the viewpoint of component costs. The number and size of the upstream rollers 631 are not particularly limited and may be selected as appropriate for the size of the plate-shaped printing medium P.

The upstream roller supporter 632 serves as a supporter that supports the plurality of upstream rollers 631, according to the present embodiment. The upstream roller supporter 632 rotatably supports the plurality of upstream rollers 631. Materials of the upstream roller supporter 632 are not particularly limited. The upstream roller supporter 632 may be made of materials including metal or plastic, for example.

Figure 7A:
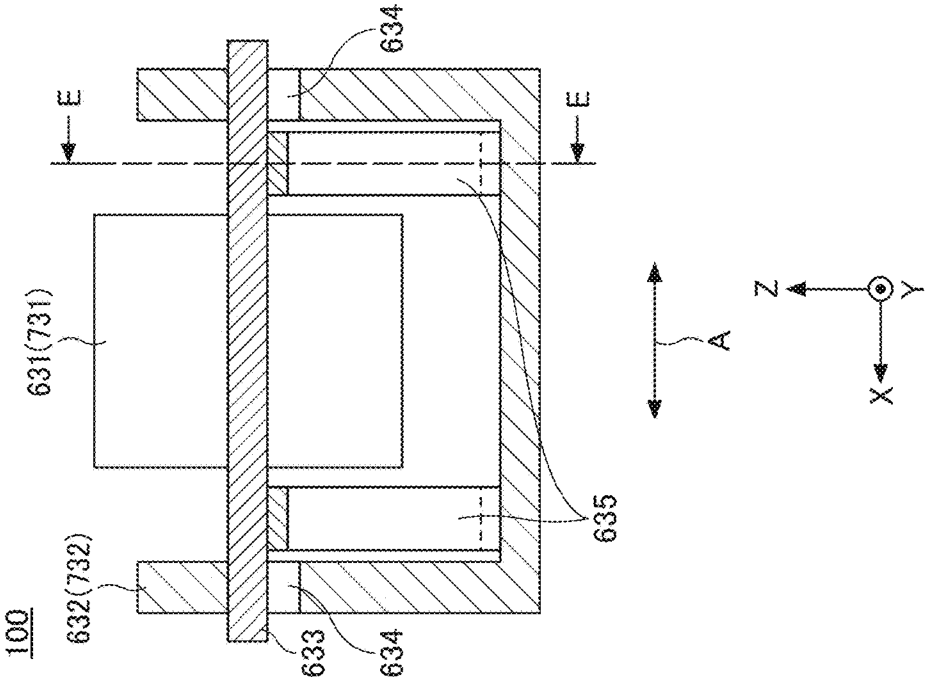
FIG. 7A is a front view of a vicinity of an upstream roller.
Figure 7B:
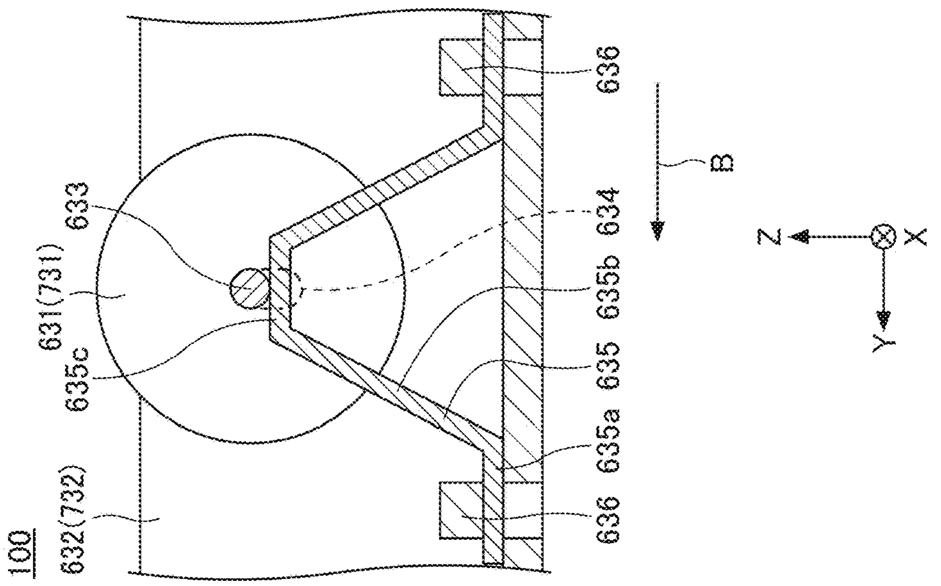
FIG. 7B is a cross-sectional view of the vicinity of the upstream roller along a line E-E of FIG. 7A.
Figure 7C:
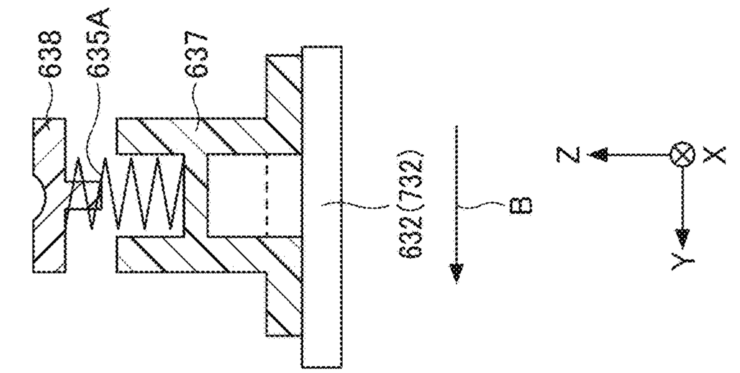
FIG. 7C is a diagram illustrating a configuration of a biasing mechanism according to a modification.

FIG. 7A is a front view of a vicinity of the upstream roller 631. FIG. 7B is a cross-sectional view of the vicinity of the upstream roller 631 along a line E-E of FIG. 7A. FIG. 7C is a diagram illustrating a configuration of a biasing mechanism according to a modification.

As illustrated in FIGS. 7A and 7B, the upstream roller 631 includes a rotating shaft 633. The upstream roller supporter 632 has rotator elongated holes 634. Flat springs 635 are disposed on the upstream roller supporter 632.

The rotating shaft 633 is a shaft-shaped member disposed so as to penetrate the cylindrical axis of the upstream roller 631. The rotator elongated hole 634 is a long hole whose longitudinal direction is the vertical direction. In the examples of FIGS. 7A to 7C, since the vertical direction corresponds to the Z direction, the vertical direction may be referred to as the Z direction in the following description. Side plates of the upstream roller supporter 632 have the rotator elongated holes 634 at positions corresponding to both sides of the upstream roller 631 along the main scanning directions A.

The flat spring 635 serves as a rotator biasing member that biases the rotating shaft 633 inserted in the rotator elongated hole 634 toward the plate-shaped printing medium P, according to the present embodiment. The flat springs 635 are disposed in pairs on both sides of the upstream roller 631 along the main scanning directions A.

The rotating shaft 633 is inserted in the rotator elongated holes 634 and is supported by the flat springs 635 so as to be rotatable integrally with the upstream roller 631 around an axis along the main scanning directions A.

The flat spring 635 includes bottom surface portions 635*a*, spring slopes 635*b*, and an upper surface portion 635*c*. The flat spring 635 has a substantially symmetrical shape. Specifically, the bottom surface portions 635*a* form a pair so as to be substantially symmetrical. Similarly, the spring slopes 635*b* form a pair so as to be substantially symmetrical. The flat spring 635 is fixed to the upstream roller supporter 632 as the bottom surface portions 635*a* are fixed to a bottom portion of the upstream roller supporter 632 with screws 636.

The upper surface portion 635*c* of the flat spring 635 contacts the rotating shaft 633. The rotating shaft 633 is biased in the +Z direction mainly by an elasticity of the spring slope 635*b*, thereby biasing the upstream roller 631 toward the plate-shaped printing medium P. The rotating shaft 633 is movable along the Z direction by the biasing force of the flat spring 635. A movement range thereof is limited by a longitudinal length of the rotator elongated hole 634.

The rotating shaft 633 inserted in the rotator elongated hole 634 moves along the +Z direction by the biasing force of the flat spring 635 so that the upstream roller 631 is biased in the +Z direction. Accordingly, the biasing mechanism that biases the upstream roller 631 toward the plate-shaped printing medium P includes the rotating shaft 633, the rotator elongated hole 634, and the flat spring 635.

However, the configuration of the biasing mechanism is not limited to the above-described configuration. For example, as illustrated in FIG. 7C, the biasing mechanism may include a receiving portion 637, a spring 635A, and a mover 638. One end of the spring 635A is inserted into a recess of the receiving portion 637. The mover 638 is connected to the other end of the spring 635A. Also in this configuration, the mover 638 biases the rotating shaft 633 in the +Z direction so that the upstream roller 631 is biased toward the plate-shaped printing medium P.

Note that the upstream roller 631 may be provided with the biasing mechanism described above or the upstream roller supporter 632 may be provided with the biasing mechanism described above.

Although the upstream support stand 6 is described as an example with reference to FIGS. 6, 7A, 7B and 7C, the downstream support stand 7 may have substantially the same configuration and function as those of the upstream support stand 6. Specifically, the downstream support stand 7 includes downstream rollers 731 and a downstream roller supporter 732. The downstream rollers 731 that are detachably attached contact the plate-shaped printing medium P and are disposed side by side in the conveyance direction B. The downstream roller supporter 732 supports the downstream rollers 731. The downstream roller 731 may be provided with a downstream biasing mechanism that biases the downstream roller 731 toward the plate-shaped printing medium P (see FIGS. 6, 7A, 7B and 7C).

Next, some effects of the image forming apparatus 100 are described.

Since the weight of a plate-shaped printing medium itself is larger than the weight of a sheet-shaped printing medium such as a sheet of paper, conveying resistance may increase and the plate-shaped printing medium may skew. To prevent the plate-shaped printing medium from skewing, there is known a configuration in which an auxiliary conveyance member such as an upstream support stand or a downstream support stand is detachably attached to an image forming apparatus.

In a configuration of a comparative image forming apparatus, the plate-shaped printing medium may be conveyed above the upstream roller 631 due to twisting of the support stands such as the upstream support stand and the downstream support stand attached to the image forming apparatus, and thus the performance of conveying the plate-shaped printing medium may deteriorate.

In the present embodiment, the image forming apparatus 100 includes the printing unit 2, the registration roller pair 3 (nipping rotator), and the upstream support stand 6. The printing unit 2 prints an image on the plate-shaped printing medium P. The registration roller pair 3 conveys the plate-shaped printing medium P to the printing unit 2. The upstream support stand 6 supports the plate-shaped printing medium P upstream from the registration roller pair 3 in the conveyance direction.

The image forming apparatus 100 further includes the plurality of upstream rollers 631 (a plurality of rotators), the upstream roller supporter 632 (supporter), and an adjustment mechanism. The plurality of upstream rollers 631 is disposed side by side in the conveyance direction B. The upstream roller supporter 632 supports the upstream rollers 631. The adjustment mechanism adjusts the relative positions of the plurality of upstream rollers 631 and the upstream roller supporter 632. The adjustment mechanism includes, for example, the rotating shaft 633, the rotator elongated hole 634, and the flat spring 635.

Even in a case where the upstream support stand 6 is attached in a twisted manner, the upstream rollers 631 are biased toward the plate-shaped printing medium P by the adjustment mechanism so that positions of the upstream rollers 631 are adjusted with respect to the upstream support stand 6. As a result, the plurality of upstream rollers 631 contacts the plate-shaped printing medium P, thus increasing an area of contact between the upstream 631 and the printing medium P and preventing deterioration of the performance of conveying the plate-shaped printing medium P. For example, a decrease in productivity of conveyance of the printing medium P is prevented. Anisotropy of conveyance that causes a difference in conveyance performance depending on the conveyance direction is prevented. Regardless of the conveyance direction, the conveyance performance is uniformized.

The image forming apparatus 100 may further include the biasing mechanism including the rotating shaft 633, the rotator elongated hole 634, and the flat spring 635. Also in this case, substantially the same effects as those of the adjustment mechanism described above are obtained.

From a viewpoint of operability and ease of installation of the image forming apparatus 100, preferably, the upstream support stand 6 is attached detachably. In addition, from a viewpoint of enhancing the adjustment accuracy of the adjustment mechanism, the upstream support stand 6 preferably includes a plurality of upstream roller supporters 632.

In the present embodiment, the downstream rollers 731 (downstream rotators) disposed side by side, the downstream roller supporter 732 (downstream supporter) that supports the downstream roller 731, and the downstream biasing mechanism that biases the downstream roller 731 toward the plate-shaped printing medium P.

Even in a case where the downstream support stand 7 is attached in a twisted manner, the downstream rollers 731 are biased toward the plate-shaped printing medium P by the adjustment mechanism so that the positions of the downstream rollers 731 are adjusted with respect to the downstream support stand 7. As a result, the plurality of downstream rollers 731 contacts the plate-shaped printing medium P, thus increasing an area of contact between the downstream rollers 731 and the printing medium P and preventing deterioration of the performance of conveying the plate-shaped printing medium P. For example, a decrease in productivity of conveyance of the printing medium P is prevented. Anisotropy of conveyance that causes a difference in conveyance performance depending on the conveyance direction is prevented. Regardless of the conveyance direction, the conveyance performance is uniformized.

From a viewpoint of operability and ease of installation of the image forming apparatus 100, preferably, the downstream support stand 7 is attached detachably. In addition, from a viewpoint of enhancing the adjustment accuracy of the downstream biasing mechanism, the downstream support stand 7 preferably includes a plurality of downstream roller supporters 732.

In the present embodiment, the upstream roller supporter 632 includes the rotator elongated hole 634 whose longitudinal direction is the Z direction (vertical direction), the rotating shaft 633, and the flat spring 635 (rotator biasing member). The rotating shaft 633 of the upstream roller 631 is inserted in the rotator elongated hole 634. The flat spring 635 biases the rotating shaft 633 toward the plate-shaped printing medium P.

The elasticity of the flat spring 635 moves the upstream rollers 631 in the Z direction along the longitudinal direction of the rotator elongated hole 634 to bring the plurality of upstream rollers 631 in contact with the plate-shaped printing medium P. As a result, a part of the plate-shaped printing medium P is prevented from being conveyed above the upstream support stand 6. Accordingly, deterioration of the performance of conveying the plate-shaped printing medium P is prevented.

Second Embodiment

Next, a description is given of an image forming apparatus 100*a* according to a second embodiment of the present disclosure. Like components as the components described in the first embodiment are denoted by like reference numerals, and redundant description is omitted as appropriate.

Figure 8B:
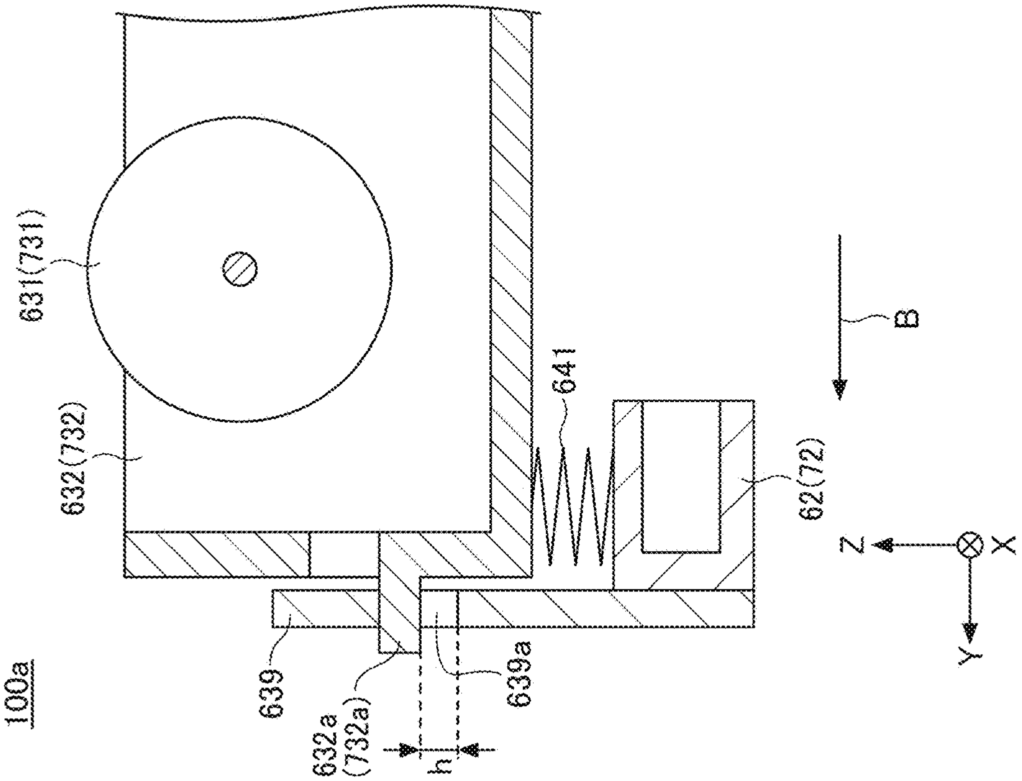
FIG. 8B is a cross-sectional view of the upstream roller supporter along a line F-F of FIG. 8A.
Figure 8A:
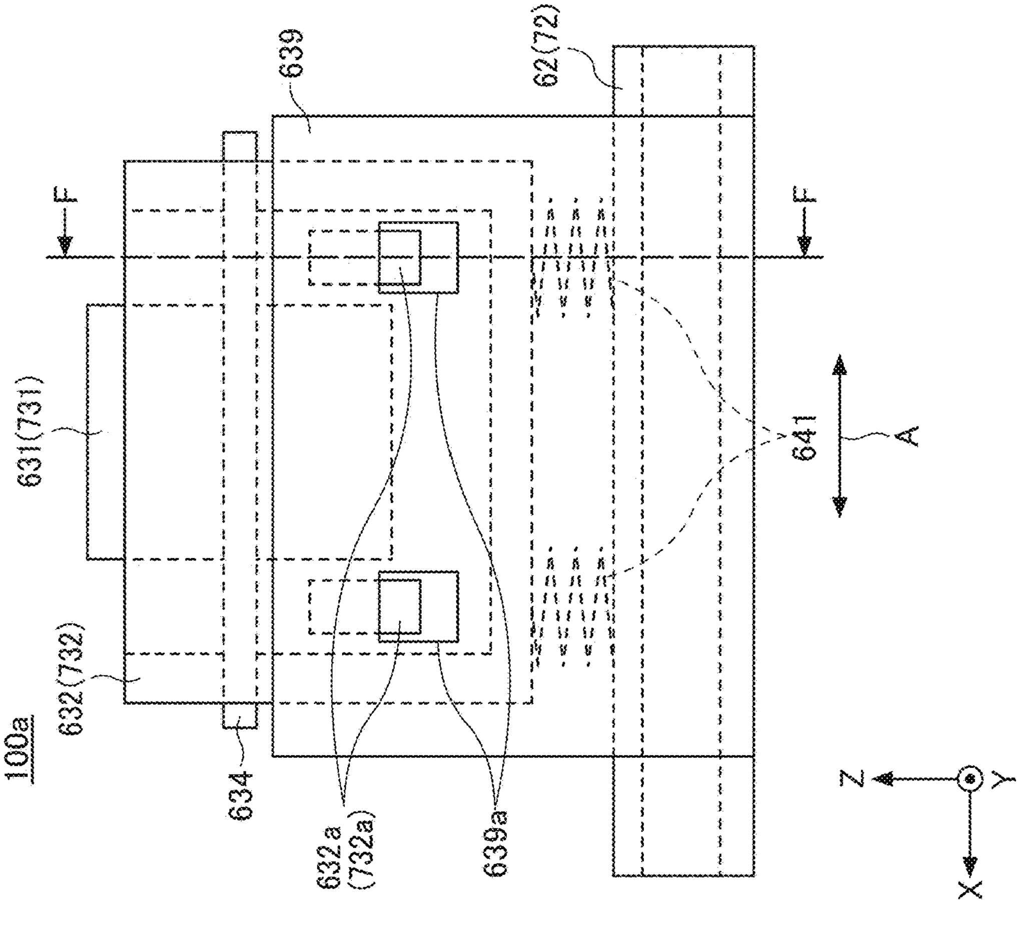
FIG. 8A is a front view of an upstream roller supporter according to a second embodiment.

FIG. 8A is a front view of the upstream roller supporter 632 disposed in the image forming apparatus 100*a*. FIG. 8B is a cross-sectional view of the upstream roller supporter 632 along a line F-F of FIG. 8A. As illustrated in FIGS. 8A and 8B, the image forming apparatus 100*a* includes an upstream support plate 639.

The upstream support plate 639 serves as a support plate that supports the upstream roller supporter 632, according to the present embodiment. The upstream support plate 639 has a supporter elongated hole 639*a* and is provided with a spring 641.

The supporter elongated hole 639*a* is a long hole whose longitudinal direction is the Z direction and is a long hole into which the upstream roller supporter 632 is inserted. A projection 632*a* formed at an end portion of the upstream roller supporter 632 along the conveyance direction B is inserted into the supporter elongated hole 639*a*. FIG. 8B illustrates a length h of the supporter elongated hole 639*a* along the Z direction.

The spring 641 serves as a supporter biasing member that biases a part of the upstream roller supporter 632 inserted in the supporter elongated hole 639*a* toward the plate-shaped printing medium P, according to the present embodiment.

The spring 641 is disposed between a bottom surface of the upstream roller supporter 632 and an upper surface of the upstream outer frame 62 and biases the bottom surface of the upstream roller supporter 632 in the +Z direction.

The elasticity of the spring 641 biases the upstream roller supporter 632 in the +Z direction so that the upstream roller 631 is biased in the +Z direction.

The projection 632*a* is movable along the Z direction by the biasing force of the spring 641. A movement range thereof is limited by a longitudinal length of the supporter elongated hole 639*a*.

The projection 632*a* inserted in the supporter elongated hole 639*a* moves along the +Z direction by the biasing of the spring 641 so that the upstream roller 631 is biased in the +Z direction. Accordingly, a biasing mechanism that biases the upstream roller 631 toward the plate-shaped printing medium P includes the projection 632*a*, the supporter elongated hole 639*a*, and the spring 641. The upstream roller supporter 632 is provided with the biasing mechanism described above.

With reference to FIGS. 8A and 8B, the configuration of an end portion of the upstream roller supporter 632 in the conveyance direction B (+Y direction) is described. Another end portion of the upstream roller supporter 632 in the −Y direction has substantially the same configuration.

With the above configuration, even in a case where the upstream support stand 6 is attached in a twisted manner, the upstream rollers 631 are biased toward the plate-shaped printing medium P by the biasing mechanism so that the positions of the upstream rollers 631 are adjusted with respect to the upstream support stand 6. As a result, the plurality of upstream rollers 631 contacts the plate-shaped printing medium P, thus increasing the area of contact between the downstream rollers 731 and the printing medium P and preventing deterioration of the performance of conveying the plate-shaped printing medium P.

Although the upstream support stand 6 is described in the present embodiment, substantially the same configuration may be applied to the downstream support stand 7, and the substantially same effects are obtained (see FIGS. 8A and 8B).

Now, a description is given of the state of the printing medium P conveyed by the image forming apparatus 100.

Figure 9A:
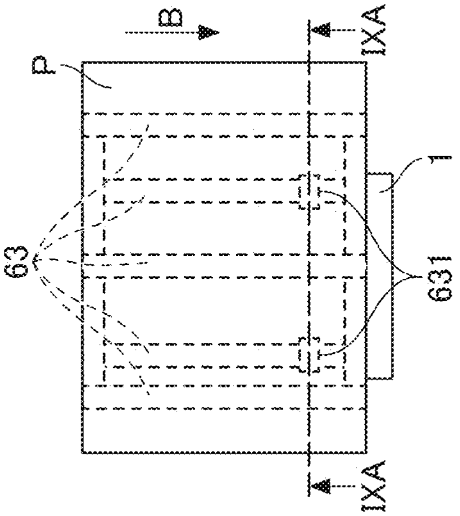
FIG. 9A is a top view of a printing medium in an ideal conveyance state according to a first example.
Figure 9B:
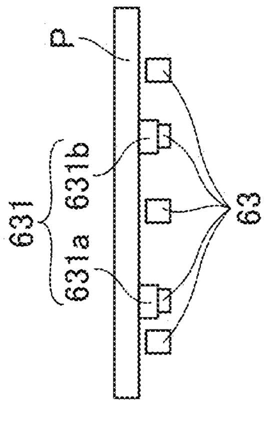
FIG. 9B is a cross-sectional view of the printing medium along a line IXA-IXA of FIG. 9A.
Figure 9C:
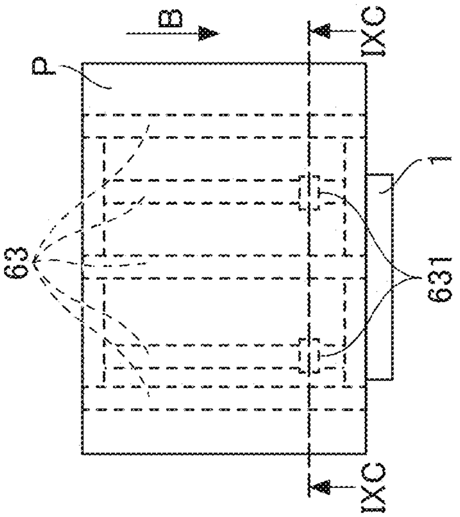
FIG. 9C is a top view of the printing medium conveyed while being inclined such that one side of an upstream supporter in a direction substantially orthogonal to the conveyance direction sinks.
Figure 9D:
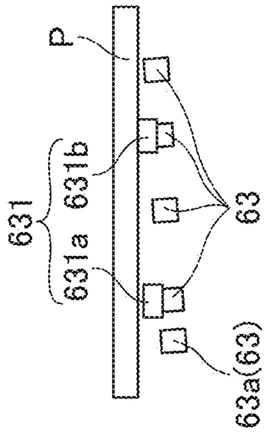
FIG. 9D is a cross-sectional view of the printing medium along a line IXC-IXC of FIG. 9C.
Figure 9E:
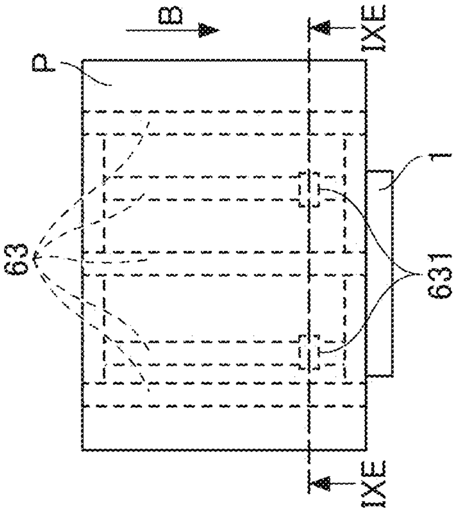
FIG. 9E is a top view of the printing medium conveyed while the upstream roller sinks and the inclination of the printing medium is corrected.
Figure 9F:
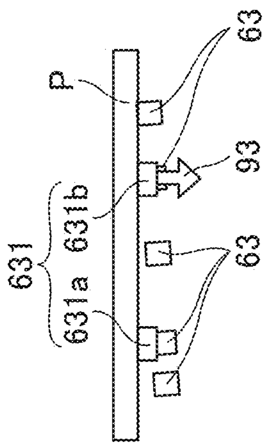
FIG. 9F is a cross-sectional view of the printing medium along a line IXE-IXE of FIG. 9E.

FIG. 9A is a top view of a printing medium P ideally conveyed by the image forming apparatus 100 according to a first example. FIG. 9B is a cross-sectional view of the printing medium P along a line IXA-IXA of FIG. 9A. FIG. 9C is a top view of the printing medium P conveyed while being inclined such that one side of the upstream supporter 63 in a direction substantially orthogonal to the conveyance direction B sinks. FIG. 9D is a cross-sectional view of the printing medium P along a line IXC-IXC of FIG. 9C. FIG. 9E is a top view of the printing medium P conveyed while the upstream roller 631*b* sinks and the inclination of the printing medium P is corrected. FIG. 9F is a cross-sectional view of the printing medium P along a line IXE-IXE of FIG. 9E.

In the ideal state illustrated in FIGS. 9A and 9B, the printing medium P is conveyed while maintaining a horizontal state in the direction substantially orthogonal to the conveyance direction B. In contrast to this ideal state, in FIGS. 9C and 9D, the printing medium P is conveyed while being inclined such that one side (close to an upstream supporter 63*a*) of the upstream supporter 63 in the direction substantially orthogonal to the conveyance direction B sinks vertically downward. As the upstream supporter 63 is inclined, an upstream roller 631*a* is not in contact with the printing medium P while the upstream roller 631*b* is in contact with the printing medium P.

In FIGS. 9E and 9F, the upstream roller 631*b* sinks in a direction indicated by white arrow 93 (vertically downward) so that the upstream roller 631*a* and the upstream roller 631*b* are in contact with the printing medium P. Thus, the inclination of the printing medium P due to an inclination of the upstream supporter 63 is corrected. In this manner, the image forming apparatus 100 corrects the inclination of the printing medium P caused by one side of the printing medium P in the direction substantially orthogonal to the conveyance direction B sinks or floats.

Figure 10A:
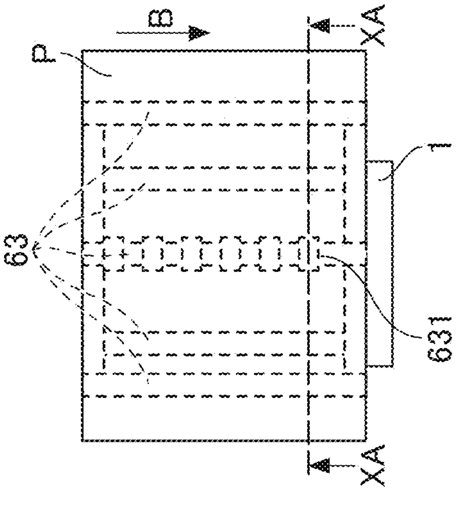
FIG. 10A is a top view of a printing medium in an ideal conveyance state according to a second example.
Figure 10B:
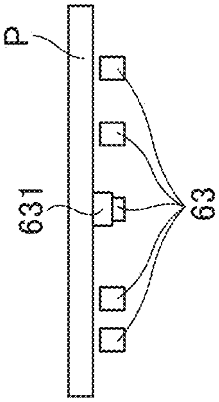
FIG. 10B is a cross-sectional view of the printing medium along a line XA-XA of FIG. 10A.
Figure 10C:
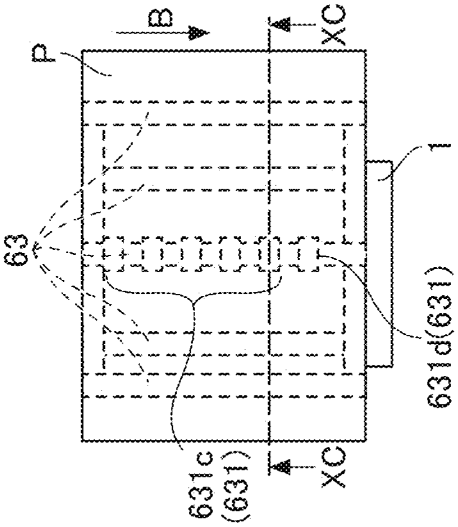
FIG. 10C is a top view of the printing medium conveyed while an upstream side of an upstream supporter in a conveyance direction sinks.
Figure 10D:
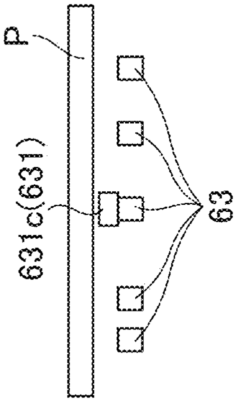
FIG. 10D is a cross-sectional view of the printing medium along a line XC-XC of FIG. 10C.
Figure 10E:
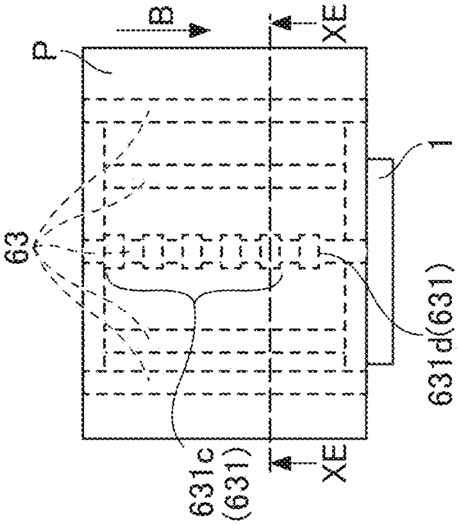
FIG. 10E is a top view of the printing medium being conveyed while the upstream roller sinks and the inclination of the printing medium is corrected.
Figure 10F:
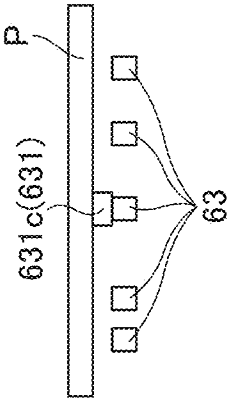
FIG. 10F is a cross-sectional view of the printing medium along a line XE-XE of FIG. 10E.

FIG. 10A is a top view of a printing medium P ideally conveyed by the image forming apparatus 100 according to a second example. FIG. 10B is a cross-sectional view of the printing medium P along a line XA-XA of FIG. 10A. FIG. 10C is a top view of the printing medium P conveyed while an upstream side of the upstream supporter 63 in the conveyance direction B sinks. FIG. 10D is a cross-sectional view of the printing medium P along a line XC-XC of FIG. 10C. FIG. 10E is a top view of the printing medium P conveyed while a plurality of upstream rollers 631*c* sinks and the inclination of the printing medium P is corrected. FIG. 10F is a cross-sectional view of the printing medium P along a line XE-XE of FIG. 10E.

In the ideal state illustrated in FIGS. 10A and 10B, the printing medium P is conveyed while maintaining a horizontal state in the conveyance direction B. In contrast to this ideal state, in FIGS. 10C and 10D, the upstream supporter 63 is conveyed in an inclined manner such that the upstream side of the upstream supporter 63 in the conveyance direction B sinks. As the upstream supporter 63 is inclined, the plurality of upstream rollers 631*c* is not in contact with the printing medium P while an upstream roller 631*d* is in contact with the printing medium P. Note that the plurality of upstream rollers 631*c* is disposed upstream from the upstream roller 631*d* in the conveyance direction B.

In FIGS. 10E and 10F, the upstream roller 631*d*, which is the most downstream roller of the plurality of upstream rollers 631, sinks vertically downward so that the plurality of upstream rollers 631*c* and the upstream roller 631*d* are in contact with the printing medium P. Thus, the inclination of the printing medium P due to an inclination of the upstream supporter 63 is corrected. In this manner, the image forming apparatus 100 corrects the inclination of the printing medium P caused by one side of the printing medium P in the conveyance direction B sinks or floats.

As described above, in the present embodiment, disposing multiple upstream rollers 631 in both the conveyance direction B and the direction orthogonal to the conveyance direction B increases the area of contact between the upstream rollers 631 and the plate-shaped printing medium P and enhancing the conveyance performance.

The above-described embodiments are examples, and the present disclosure is not limited to the above embodiments described specifically. Modifications and variations of the embodiments can be made without departing from the spirit and scope of the disclosure described in the claims unless limited in the above description.

Such variations are not to be regarded as a departure from the scope of the present disclosure and appended claims, and all such modifications are intended to be included within the scope of the present disclosure and appended claims.

The numbers such as ordinal numbers and numerical values that indicates quantity are all given by way of example to describe the technologies to implement the embodiments of the present disclosure, and no limitation is indicated to the numbers given in the above description.

The invention claimed is:

1. An image forming apparatus comprising:

a printing device configured to print an image on a plate-shaped printing medium;

a nipping rotator configured to convey the plate-shaped printing medium;

an upstream support stand configured to support the plate-shaped printing medium at a position upstream from the nipping rotator in a conveyance direction of the plate-shaped printing medium;

a plurality of rotators disposed side by side;

a supporter supporting the plurality of rotators;

an adjusting mechanism configured to adjust relative positions of the plurality of rotators and the supporter;

a downstream support stand configured to support the plate-shaped printing medium at a position downstream from the nipping rotator in the conveyance direction;

a plurality of downstream rotators disposed side by side;

a downstream supporter supporting the plurality of downstream rotators; and a downstream biasing mechanism configured to bias the plurality of downstream rotators against the plate-shaped printing medium.

2. The image forming apparatus according to claim 1, wherein the upstream support stand is detachably attached to the image forming apparatus.

3. The image forming apparatus according to claim 1, wherein the upstream support stand includes a plurality of supporters including the supporter.

4. The image forming apparatus according to claim 1, wherein the downstream support stand is detachably attached to the image forming apparatus.

5. The image forming apparatus according to claim 1, wherein the downstream support stand includes a plurality of downstream supporters including the downstream supporter.

6. An image forming apparatus comprising:
a printing device configured to print an image on a plate-shaped printing medium;
a nipping rotator configured to rotate while nipping the plate-shaped printing medium and convey the plate-shaped printing medium to the printing device;
an upstream support stand configured to support the plate-shaped printing medium at a position upstream from the nipping rotator in a conveyance direction of the plate-shaped printing medium;
a plurality of rotators disposed side by side;
a supporter supporting the plurality of rotators;
an adjusting mechanism configured to adjust relative positions of the plurality of rotators and the supporter;
a downstream support stand configured to support the plate-shaped printing medium at a position downstream from the nipping rotator in the conveyance direction;
a plurality of downstream rotators disposed side by side;
a downstream supporter supporting the plurality of downstream rotators; and
a downstream biasing mechanism configured to bias the downstream supporter against the plate-shaped printing medium.

7. The image forming apparatus according to claim 6, wherein the upstream support stand is detachably attached to the image forming apparatus.

8. The image forming apparatus according to claim 6, wherein the upstream support stand includes a plurality of supporters including the supporter.

9. The image forming apparatus according to claim 6, wherein the downstream support stand is detachably attached to the image forming apparatus.

10. The image forming apparatus according to claim 6, wherein the downstream support stand includes a plurality of downstream supporters including the downstream support.

* * * * *